United States Patent
Tsuji et al.

(10) Patent No.: US 6,787,494 B2
(45) Date of Patent: Sep. 7, 2004

(54) MOLDED PRODUCT OF ACTIVATED CARBON AND A METHOD FOR PRODUCTION THEREOF

(75) Inventors: Masanori Tsuji, Osaka (JP); Masaaki Kameno, Osaka (JP); Keizo Furukawa, Osaka (JP)

(73) Assignee: Japan EnviroChemicals, Ltd., Osaka (JP)

( * ) Notice: Subject to any disclaimer, the term of this patent is extended or adjusted under 35 U.S.C. 154(b) by 170 days.

(21) Appl. No.: 10/046,081

(22) Filed: Jan. 16, 2002

(65) Prior Publication Data

US 2002/0155252 A1 Oct. 24, 2002

(30) Foreign Application Priority Data

Jan. 31, 2001 (JP) ........................................ 2001-023335

(51) Int. Cl.[7] ........................... C04B 35/52; C01B 31/00
(52) U.S. Cl. ...................... 501/99; 264/29.1; 264/29.6
(58) Field of Search ............................... 264/29.1, 29.6; 501/99

(56) References Cited

U.S. PATENT DOCUMENTS

2002/0027305 A1 * 3/2002 Kibi et al.

FOREIGN PATENT DOCUMENTS

| EP | 0 645 346 | | 3/1995 |
| JP | 6-198165 | * | 7/1994 |
| JP | 9-293648 | * | 11/1997 |

OTHER PUBLICATIONS

Abstract of JP 07–207119 A2.
Abstract of JP 49–115110 A2.
Abstract of JP 57–027130 A2.
Abstract of JP 03–42039 A2.
Abstract of JP 55–187118 A2.

* cited by examiner

*Primary Examiner*—Christopher A. Fiorilla
(74) *Attorney, Agent, or Firm*—Wenderoth, Lind & Ponack, L.L.P.

(57) ABSTRACT

An molded product of activated carbon produced by molding a kneaded mixture containing an activated carbon, a solvent, and a phenol-aldehyde type resin being solid in a normal temperature and containing 50 to 95% by weight of components soluble in the solvent used, drying and curing the molding, and then carbonizing the molding in an inert gas has a high adsorption capability and a high mechanical strength, e.g., a compressive strength, especially the strength after being contacted with an acid or water.

7 Claims, No Drawings

MOLDED PRODUCT OF ACTIVATED CARBON AND A METHOD FOR PRODUCTION THEREOF

FIELD OF THE INVENTION

The present invention relates to a molded product of activated carbon and a method for production thereof.

A molded product of activated carbon of the present invention is excellent in an adsorptive capability and mechanical strength and it can be used in a wide range of fields for removal of malodor evolved in wastewater treatment facilities, solvent recovery, ozone treatment and the like.

PRIOR ART

So far some production methods for molded product of activated carbon using phenol-aldehyde type resin as a binder have been known. Japanese Unexamined Patent Publication No. 115110/1974 discloses a method for producing a molded product of activated carbon by adding a phenol-aldehyde type resin to a carbon material such as charcoal or the like, molding the resulted mixture with an extruder, and then carbonizing the molding, optionally activating the molding after the carbonization. However, the specific surface area of the activated carbon after carbonization is no more than 300 $m^2/g$ and the activation should be carried out to obtain a molded product with the specific surface area of 1,100 $m^2/g$. Japanese Unexamined Patent Publication No.27130/1982 and Japanese Unexamined Patent Publication No. 42039/1991 disclose methods wherein a synthetic resin fiber of a phenol type resin, a melamine type resin and the like are used as a carbonaceous material and a powdered activated carbon is used as a carbon material, respectively, and after the respective carbon materials are mixed with a phenol resin type binder and molded, and the resulting molded products are carbonized and activated.

However, after molding the above methods require the activation step of the carbon material and consequently, the production cost is high and the molded products are poor in the mechanical strength. Therefore, these methods are not preferable from the industrial point of view.

Japanese Unexamined Patent Publication No. 167118/1980 and Japanese Unexamined Patent Publication No. 207119/1995 disclose methods for producing a molded product of activated carbon by molding an activated carbon using a phenol-aldehyde type resin as a binder in liquid state at a normal temperature, drying and curing the obtained molding. However, in the case of these techniques, no activation is carried out and the phenol-aldehyde type resin as a binder blocks up the pores of the activated carbon, so that it results in a problem that the adsorption capability of the activated carbon is considerably lowered.

Problems To Be Solved by the Invention

In conventional methods as described above, there are problems that a step of activation after carbonization is indispensable in order to obtain the activated carbon moldings having a high adsorption capability even when an activated carbon and a phenol-aldehyde type resin are used as raw materials, and that the production process becomes complicated and the mechanical strength of the moldings is poor.

Especially, when the structure of a molded product of activated carbon is honeycomb, a high mechanical strength is required as well as the high adsorption capability. An activated carbon honeycomb available in the market is generally produced by adding a binder such as methylcellulose or the like together with an inorganic material such as clay to an activated carbon, kneading and molding the obtained mixture, and then carbonizing the molding. However, the activated carbon honeycombs produced by the above methods have problems that the mechanical strength is considerably decreased if it is used under the conditions where it is contacted with an acid such as in the case of using it for deodorization in wastewater treatment facilities Means for Solving the Problems The present invention provides a molded product of activated carbon with a high adsorption capability and a high mechanical strength and a method for producing the molded product of activated carbon by molding a kneaded mixture containing an activated carbon, a solvent, and a phenol-aldehyde type resin being solid in a normal temperature (25° C.) and containing 50 to 95% by weight of components soluble in the solvent, drying and curing the molding, and then carbonizing the molding in the inert gas atmosphere without activation step to follow.

That is, the invention provides:

(1.) A molded product of activated carbon obtained by the steps comprising (1) molding a kneaded mixture containing an activated carbon, a solvent, and a phenol-aldehyde type resin being solid in a normal temperature and containing 50 to 95% by weight of components soluble in the solvent, (2) drying and curing the molding, and then (3) carbonizing the molding in an inert gas atmosphere:

(2.) The molded product of activated carbon as described in (1.) in which the amount of the phenol-aldehyde type resin is 10 to 80% by weight relative to the total weight of the activated carbon and the phenol-aldehyde type resin and the amount of the solvent is 10 to 60% by weight relative to the total weight of the activated carbon and phenol-aldehyde type resin:

(3.) The molded product of activated carbon as described in (1.) in which the shape of the molding is a pellet shape, a spherical shape, or a honeycomb shape:

(4.) The molded product of activated carbon as described in (1.) in which the solvent is alcohols, ethers, ketones, esters, aprotic solvent, or a mixture of water with at least one of these solvents:

(5.) The molded product of activated carbon as described in (1.) in which the drying is carried out at 70 to 150° C.:

(6.) The molded product of activated carbon as described in (1.) in which the carbonization is carried out at 500 to 1500° C.: and (7.) A method of producing a molded product of activated carbon comprising steps of (1) molding a kneaded mixture containing an activated carbon, a solvent, and a phenol-aldehyde type resin being solid in a normal temperature and containing 50 to 95% by weight of components soluble in the solvent, (2) drying and curing the molding, and then (3) carbonizing the molding in the inert gas atmosphere:

PREFERRED EMBODIMENTS OF THE INVENTION

In the process for the production of the molded product of activated carbon of the present invention, the activated carbon with specific surface area of 400 to 2,500 $m^2/g$, preferably 600 to 2,200 $m^2/g$, and more preferably 800 to 2,000 $m^2/g$ is used as a raw material. Regarding the particle size of the activated carbon to be used, particles having less than 150 μm in size are contained generally in 95 to 100% by weight, preferably in 97 to 100% by weight, and more preferably in 99 to 100% by weight. Incidentally, a raw material for the activated carbon is not particularly restricted and an activated carbon produced from coconut shells, wood powders, saw dust char, coal, organic compound derivatives, and the like can be used. Above all, an activated carbon produced from coconut shells is preferably used.

Those usable as the phenol-aldehyde type resin are thermosetting type ones and solid at 25° C., more preferably solid at 50° C. The amount of the soluble components of the phenol-aldehyde type resin in the solvent used is determined by adding solvent in a weight twenty times as much as that of the resin to the resin, stirring at a room temperature (25° C.) for 1 hour with a magnetic stirrer, and then filtering the resulting solution through filter paper No. 5A (manufactured by Toyo Roshi Co., Ltd.), and measuring the resin remaining on the filter paper after drying.

The amount of the solvent-soluble components of the phenol-aldehyde type resin to be used in the present invention is generally 50 to 95% by weight, preferably 60 to 93% by weight, and more preferably 70 to 90% by weight. If the amount of the soluble components is higher than these values, the phenol-aldehyde type resin easily gets into the pores of the activated carbon, so that the adsorption capability of the produced molded product of activated carbon is lowered. If the amount of the soluble components is lower than these values, the phenol-aldehyde type resin cannot sufficiently function as a binder, so that the strength of the produced molded product of activated carbon is decreased. The phenol-aldehyde type resin is required to be solid at a normal temperature (25° C.).

The form or shape of the solid phenol-aldehyde type resin is not particularly restricted and, for examples, spherical, pulverized, needle-like ones are usable and a spherical one is preferably used. The specific gravity of the phenol-aldehyde type resin is generally 1.0 to 1.5 and preferably 1.1 to 1.4. The bulk density of the phenol-aldehyde type resin is generally 0.3 to 0.7 g/ml and preferably 0.35 to 0.6 g/ml and its particle size satisfies that particles with a particle size of 150 μm or smaller are generally in 99 to 100% by weight and particles with a particle size of 75 μm or smaller are preferably in 98 to 100% by weight. The average particle diameter of the phenol-aldehyde type resin is generally 10 to 50 μm and preferably 15 to 40 μm.

Typical examples of the phenol-aldehyde type resin satisfying these conditions are those produced by copolymerization of phenol or phenolic compounds with formaldehyde. As the phenolic compounds other than phenol, the following compounds may be included; o-cresol, m-cresol, p-cresol, bisphenol A, o-, m- or p-$C_3$ to $C_6$ alkylphenol, p-phenylphenol, xylenol, hydroquinone, and resorcin. At the time of producing these resins, raw materials may include urea, thiourea, their methylol derivatives, aniline, melamine, guanidine, guanamine, or dicyandiamide.

The phenol-aldehyde type resin may be any one produced by any known production method. Production methods of the phenol-aldehyde type resin are, for example, described in Japanese Unexamined Patent Publication No.177011/1982, Japanese Unexamined Patent Publication No. 17114/1983 and the like. The phenol-aldehyde type resin to be used in the invention is not particularly restricted to those produced by such methods and any one can be used as long as it satisfies the above-described conditions.

The solvent is to be used for dissolving or dispersing the phenol-aldehyde type resin and includes alcohols, ethers, ketones, esters, aprotic solvent and the like, or a mixture of water and at least one of the solvents. Examples of the alcohols include aliphatic alcohols such as methyl alcohol, ethyl alcohol, n-propyl alcohol, isopropyl alcohol, n-butyl alcohol, quaternary butyl alcohol, isobutyl alcohol, n-amyl alcohol, secondary amyl alcohol, 1-ethyl-1-propanol, 2-methyl-1-butanol, isoamyl alcohol, quaternary amyl alcohol, secondary isoamyl alcohol, neoamyl alcohol, n-hexyl alcohol, 2-methyl-1-pentanol, heptyl alcohol, n-octyl alcohol, 2-ethylhexyl alcohol, higher alcohols and the like; unsaturated aliphatic alcohols such as allyl alcohol; aromato-aliphatic or alicyclic alcohols such as benzyl alcohol, cyclohexyl alcohol, furfuryl alcohol and the like; polyhydric alcohols such as ethylene glycol, diethylene glycol, triethylene glycol, glycerin, trimethylol propane, polyethylene glycol and the like. Examples of the ethers include alcohol ethers such as ethylene glycol monoethyl ether, diethylene glycol monomethyl ether, diethylene glycol monoethyl ether and the like; the ethers such as ethylene glycol dimethyl ether, ethylene glycol diethyl ether, diethylene glycol dimethyl ether, diethylene glycol diethyl ether, and the like. Examples of the ketones include acetone, diethyl ketone and the like. Examples of the esters include ethyl acetate, butyl acetate and the like. Examples of aprotic solvents include acetonitrile, N,N-dimethylformamide, N-methylpyrrolidone, dimethyl sulfoxide, sulfolane and the like are employable. Alcohols and ethers are preferably used. The mixtures of water with at least one of the solvents include the solvents already containing water. The amount of already contained water can be chosen depending on the types of the solvents to be used and is generally up to 30% by weight and preferably up to 10% by weight.

In the invention, the solvents are not restricted to those exemplified and any solvent can be used as long as it is capable of dissolving the phenol-aldehyde type resin.

As an auxiliary binder in the molding treatment in this invention, a cellulose ether derivative may be used. Typical examples of the cellulose ether derivatives are methylcellulose, ethyl hydroxyethyl cellulose, hydroxbutyl cellulose, hydroxybutyl methylcellulose, hydroxyethyl cellulose, hydroxymethylcellulose, hydroxypropyl cellulose, hydroxypropyl methylcellulose, hydroxyethyl methylcellulose, and their mixtures, yet it is not restricted to these compounds.

Further, as another molding assisting agent, polysaccharides, polyethylene glycol and the like may be added based on necessity and the types and the combinations are not particularly restricted in this invention.

The amount of the phenol-aldehyde type resin is preferably 10 to 80% by weight, more preferably 15 to 70% by weight, and the most preferably 20 to 50% by weight relative to the total weight of the activated carbon and the phenol-aldehyde type resin.

The amount of the solvent is preferably 10 to 60% by weight, more preferably 20 to 50% by weight relative to the total weight of the activated carbon and the phenol-aldehyde type resin.

In order to lower the load on an extruder at the time of extrusion molding, water may further be added immediately before the extrusion. The additional amount of water at that time can be adjustable depending on the load on the extruder and is generally 30 to 150% by weight, preferably 50 to 120% by weight relative to the total weight of the activated carbon and the phenol-aldehyde type resin.

The amount of a cellulose ether derivative to be used is generally 1 to 30% by weight, preferably 3 to 25% by weight, and most preferably 5 to 20% by weight relative to the total weight of the activated carbon and the phenol-aldehyde type resin.

The phenol-aldehyde type resin, the activated carbon, and the solvent are added and kneaded sufficiently. The kneading method is not particularly restricted and an apparatus such as a paddle mixer, a kneader mixer, a conical screw mixer and the like is usable.

The kneaded mixture is molded into a prescribed shape. The shape of the molded product of activated carbon may be a honeycomb, pellet and spheres. Their molding methods are not particularly restricted and known methods for the respective molding shapes can be employed. In the case of molding a honeycomb shape, a method for molding by extrusion from a honeycomb die is conveniently applicable. The shape and the size of the honeycomb to be extruded are not particularly restricted and a honeycomb can be produced in conventional forms such as a round form, a square form, a rectangular form, hexangular form or the like. The number of the cells of the honeycomb is 100 to 800 cell/in$^2$, preferably 200 to 600 cell/in$^2$, and the rib thickness of the honeycomb is generally 0.08 to 3.0 mm, preferably 0.1 to 2.5 mm. In order to improve the strength of the honeycomb structure itself, the thickness of the ribs in the circumferential part of the honeycomb may be thickened, or the ribs may be crossed in the honeycomb, or other devices and modifications may be applied. In the case of a pellet shape, a typical method includes an extrusion molding by a pelletizer, and in the case of a spherical shape, a typical method includes a rotating granulating method.

After being dried and cured, the molding of activated carbon is carbonized under an inert gas atmosphere. Drying is carried out to evaporate water and low boiling point substances contained in the molding.

The drying temperature is generally 70 to 150° C., preferably 80 to 140° C., more preferably 90 to 130° C. The suitable drying period can be taken depend on shapes, size and thickness etc. of the moldings. In case of a small size molding, for example a honeycomb in size of 30 mm×30 mm×30 mm(thickness), it takes 1 to 8 hours, preferably 2 to 4 hours. In case of a large size molding, for example, a honeycomb in size of 150 mm×150 mm×100 mm(thickness), it takes in general 5 to 80 hours, preferably 10 to 60 hours. A drying apparatus to be employed is not particularly restricted and known drying methods may be employed to carry out drying suitable for the respective shapes. Humidity inside of the drying apparatus may be controlled from outside. Typical examples are stationary drying method by an electric drying apparatus, continuous drying method in a conveyer furnace for the honeycomb shape and drying method by a rotary drier for the pellet and the spherical shape.

The molding after drying is heated to melt the phenol-aldehyde type resin and cure the resin under an inert gas atmosphere generally at 150 to 250° C., preferably 170 to 220° C. The curing period is generally 0.5 to 5 hours and may properly be taken depending on the content of the phenol-aldehyde type resin. The steps from the drying to the curing of the product can be carried out continuously in the same apparatus.

After curing, the carbonization is carried out under an inert gas atmosphere. The carbonization temperature is generally 500 to 1,500° C., preferably 700 to 1,200° C. The carbonization period is generally 0.5 to 10 hours, preferably 1 to 8 hours and may properly be adjusted depending on the amount of the phenol-aldehyde type resin. The steps from the curing to the carbonization may be carried out continuously with the same apparatus.

The inert gas atmosphere may be prepared by passing an inert gas such as nitrogen gas, argon gas, or a gas mixture of these gases, a gas containing mainly these gases or a combustion gas; shutting air by burying the moldings in a carbon material such as coke and the like, and may properly be selected depending on the shape and the size of the molded product of activated carbon. An apparatus to be employed for the curing and the carbonization is not particularly restricted and known method may be employed depending on the respective shapes. Typical examples are stationary drying by an electric drying apparatus, continuous drying in a conveyer furnace for the honeycomb shape and drying by a rotary kiln and a fluidized furnace for the pellet and the spherical shape.

A molded product of activated carbon of the present invention has a high adsorption capability and a high mechanical strength as compared with a conventional one and keeps the high strength even after being contacted with an acid or water. Consequently, it can be used in a wide range of fields for removal of malodor evolved in wastewater treatment facilities, solvent recovery, ozone treatment and the like.

EXAMPLES

Hereinafter, the invention will be described more practically with the reference of Examples, Comparative examples, and Test examples.

Example 1

An activated carbon powder produced by activating a coconut shell char by steam was used. The activated carbon had a specific surface area of 1,600 m$^2$/g and contained particles with a particle size of 150 μm or smaller in 99% by weight.

As the phenol-aldehyde type resin, Bellpearl S 890 (manufactured by Kanebo, Ltd.) was used. The phenol-aldehyde type resin was produced by copolymerization of phenols and formaldehyde, solid powder at a normal temperature (25° C.), spherical shape, containing particles with 75 μm or smaller in 98.5% by weight, had a specific gravity of 1.24 and a bulk density of 0.4 g/cc.

Methyl alcohol was used as a solvent. Methyl alcohol-soluble components of the phenol-aldehyde type resin were in 94% by weight. Further, methylcellulose was used as an assisting agent for molding.

The activated carbon, the phenol-aldehyde type resin, methyl alcohol, methylcellulose and water were added in the following ratios and mixed.

The ratios of the respective components in Examples and Comparative examples were shown by % by weight relative to the total weight of the activated carbon and the phenol-aldehyde type resin.

| | |
|---|---|
| Activated carbon | 60% by weight |
| Phenol-aldehyde type resin | 40% by weight |
| Methyl alcohol | 30% by weight |
| Water | 85% by weight |
| Methyl cellulose | 15% by weight |

The mixture of these substances was molded in a honeycomb having the number of cells 300 cell/in$^2$, a rib thickness of 0.15 mm, a square shape of 30 mm×30 mm, and a length of 30 mm with an extruder equipped with the die. The molding was set in an electric drying apparatus and dried at 115° C. for 2 hours and then the resulting molding body was put in a porcelain box which was filled with coke after that to shut air. The porcelain box was put in an electric furnace and heated to 200° C. in a condition of 5° C./min speed and kept at the temperature for 1 hour and then heated to 900° C. at 5° C./min heating rate and kept for 1 hour to carry out carbonization. After cooling, the activated carbon honeycomb was taken out of the porcelain box.

Example 2

The same activated carbon and phenol-aldehyde type resin as those in Example 1 were used and isopropyl alcohol was used as a solvent. The soluble components of the phenol-aldehyde type resin in isopropyl alcohol were 85% by weight.

The phenol-aldehyde type resin, the activated carbon, methylcellulose, isopropyl alcohol, and water were added in the following ratios and mixed.

| | |
|---|---|
| Activated carbon | 60% by weight |
| Phenol-aldehyde type resin | 40% by weight |
| Isopropyl alcohol | 30% by weight |
| Water | 85% by weight |
| Methyl cellulose | 15% by weight |

An activated carbon honeycomb was produced from the resulting mixture in the same manner as Example 1.

Example 3

The same activated carbon and phenol-aldehyde type resin were used as those in Example 1. Ethylene glycol is used as a solvent. The soluble component of the phenol-aldehyde type resin in ethylene glycol was 65% by weight.

The phenol-aldehyde type resin, the activated carbon, ethylene glycol and methylcellulose were added in the following ratios and mixed.

| | |
|---|---|
| Activated carbon | 60% by weight |
| Phenol-aldehyde type resin | 40% by weight |
| Ethylene glycol | 30% by weight |
| Water | 85% by weight |
| Methyl cellulose | 15% by weight |

An activated carbon honeycomb was produced from the resulting mixture in the same manner as in Example 1.

Comparative Example 1

The same activated carbon and phenol-aldehyde type resin as those of Example 1 were used and ethylene glycol mono methyl ether was used as a solvent. The soluble components of the phenol-aldehyde type resin in ethylene glycol mono methyl ether were 99.5% by weight.

The phenol-aldehyde type resin, the activated carbon, ethyle glycol mono methyl ether, methylcellulose and water were added in the following ratios and mixed.

| | |
|---|---|
| Activated carbon | 60% by weight |
| Phenol-aldehyde type resin | 40% by weight |
| Ethylene glycol mono methyl ether | 30% by weight |
| Water | 85% by weight |
| Methylcellulose | 15% by weight |

An activated carbon honeycomb was produced from the resulting mixture in the same manner as in Example 1.

Comparative Example 2

The same activated carbon used in Example 1 was used. As the phenol-aldehyde type resin, Bellpearl S 890 (manufactured by KANEBO, Ltd.) was used. The phenol-aldehyde type resin was produced by copolymerization of phenols and formaldehyde, solid powder at a normal temperature (25° C.), spherical shape, containing particles with 75 μm or smaller in 98.5% by weight, had a specific gravity of 1.24 and a bulk density of 0.4 g/cc.

Isopropyl alcohol was used as a solvent. Isopropyl alcohol-soluble components of the phenol-aldehyde type resin were included in 29% by weight.

The activated carbon, the phenol-aldehyde type resin, isopropyl alcohol, methylcellulose and water were added in the following ratios and mixed.

| | |
|---|---|
| Activated carbon | 60% by weight |
| Phenol-aldehyde type resin | 40% by weight |
| Isopropyl alcohol | 30% by weight |
| Water | 85% by weight |
| Methyl cellulose | 15% by weight |

An activated carbon honeycomb was produced from the resulting mixture in the same manner as Example 1.

Comparative Example 3

The same activated carbon and phenol-aldehyde type resin as those of Example 1 were used. Without using a solvent, the phenol-aldehyde type resin, the activated carbon, methylcellulose, and water were added in the following ratios and mixed.

| | |
|---|---|
| Activated carbon | 60% by weight |
| Phenol-aldehyde type resin | 40% by weight |
| Water | 85% by weight |
| Methyl cellulose | 15% by weight |

An activated carbon honeycomb was produced from the resulting mixture in the same manner as Example 1. However, the molding after the carbonization did not have sufficient strength and the shape of the molding was collapsed.

Comparative Example 4

A molded product of activated carbon was produced from the same mixture as used in Example 1 by kneading, molding and drying, but the carbonization was not carried out.

Test Example 1

As an index showing the adsorption capability of each activated carbon honeycomb obtained in Examples 1 to 3 and Comparative examples 1 to 4, the specific surface area was measured. A specimen produced by pulverizing each honeycomb was measured with ASAP 2400 manufactured by Micro Meritex Co. The specimen was degassed in vacuo at 250° C. for 2 hours and the equilibrium adsorption volume of the nitrogen at −196° C. was measured at 5-points in the range of a relative pressure 0.01 to 0.1. The calculation of the specific surface area was carried out based on the BET equation.

As an index showing the mechanical strength of each honeycomb, the compressive strength was measured. Each honeycomb specimen was processed to be a piece of 10 mm×10 mm×10 mm. The cell face of the specimen was pressed at a rate of 1 mm/min. with Autograph manufactured by Shimadzu Corporation and the maximum load point at break was determined as the compressive strength.

Test Example 2

Using an activated carbon honeycomb molded in the honeycomb shape of Example 1 and a commercialized activated carbon honeycomb, the decrease of the compressive strength was compared by measuring the compressive strength by the same method as Test example 1 after contact with an acid. The commercialized activated carbon honeycomb was produced from raw materials of mainly a granular activated carbon and clay.

After the respective activated carbon honeycombs were entirely immersed in an aqueous 20% sulfuric acid solution and boiled for 1 hour and then dried at 115° C. After that, the same operation was repeated and the compressive strength of each specimen before and after the treatment was compared.

TABLE 1

| | | Example 1 | Example 2 | Example 3 | Comparative example 1 | Comparative example 2 | Comparative example 3 | Comparative example 4 |
|---|---|---|---|---|---|---|---|---|
| Phenol resin | Form (25° C.) | Powder | Powder | Powder | Powder | Powder | Powder | Powder |
| | Solvent-soluble components (% by weight) | 94 | 85 | 65 | 99.5 | 29 | — | 94 |
| Type of solvent | | Methyl alcohol | Isopropyl alcohol | Ethlene glycol | Ethylene glycol mono methyl ether | Isopropyl alcohol | — | Methyl alcohol |
| Composition (% by weight) | Activated carbon | 60 | 60 | 60 | 60 | 60 | 60 | 60 |
| | Phenol-aldehyde type resin | 40 | 40 | 40 | 40 | 40 | 40 | 40 |
| | Methyl cellulose | 15 | 15 | 15 | 15 | 15 | 15 | 15 |
| | Solvent | 30 | 30 | 30 | 30 | 30 | — | 30 |
| | Water | 85 | 85 | 85 | 85 | 85 | 85 | 85 |
| Steps | Drying (115° C.) | ◯ | ◯ | ◯ | ◯ | ◯ | ◯ | ◯ |
| | Carbonization (900° C.) | ◯ | ◯ | ◯ | ◯ | ◯ | ◯ | — |
| Specific surface area (m$^2$/g) | | 1033 | 980 | 986 | 596 | 1070 | 1100 | 414 |
| Compressive strength (MPa) | | 4.5 | 3.6 | 3.2 | 4.9 | 0.5 | <0.1 | 8.1 |

As is clear from Table 1, the molded products obtained in Examples 1 to 3 had high compressive strength as well as a high adsorptive capability. Those obtained in Comparative Example 1 where ethylene glycol mono methyl ether dissolving almost all of the resin was used as the solvent, and obtained in Comparative example 4 where no carbonization was carried out had a low specific surface area and therefore, their use as an adsorbent was restricted to some extent because of their low adsorption capability.

The molded products obtained in Comparative example 2 where the phenol-aldehyde type resin with a low solubility in solvent was used and in Comparative example 3 where no solvent was used, had almost the same adsorption capability as those obtained in Examples 1 to 3, but the strength was not enough to keep their shape as the molded products.

From the results as described above, an moldings of activated carbon produced by a method of the invention comprising steps of molding a kneaded mixture containing an activated carbon, a phenol-aldehyde type resin, and a specified solvent of the invention, drying and curing the molding body, and then carbonizing the molding body in an inert gas atmosphere was confirmed to have a high adsorption capability and a high strength.

TABLE 2

(Unit: MPa)

| | Before treatment | After one-time treatment | After two-times treatment |
|---|---|---|---|
| Example 1 | 3.8 | 3.6 | 3.5 |
| Commercialized activated carbon honeycomb | 2.0 | 1.6 | 1.5 |

The activated carbon honeycomb obtained in Example 1 had the strength 1.9 times as high as that of the commercialized activated carbon honeycomb and the strength decrease after the contact with the acid was also suppressed to low as compared with that of the commercialized activated carbon honeycomb.

What is claimed is:

1. A molded product of activated carbon obtained by steps comprising (1) molding a kneaded mixture containing an activated carbon, a solvent, and a phenol-aldehyde resin being solid at 25° C. and containing 50 to 95% by weight of components soluble in the solvent, (2) drying and curing the molded mixture, and then (3) carbonizing the molded mixture in an inert gas atmosphere.

2. The molded product of activated carbon according to claim 1, wherein the amount of the phenol-aldehyde resin is 10 to 80% by weight relative to the total weight of the activated carbon and the phenol-aldehyde resin and the amount of the solvent is 10 to 60% by weight relative to the total weight of the activated carbon and phenol-aldehyde resin.

3. The molded product of activated carbon according to claim 1, wherein the molded product of activated carbon is molded in the shape of a pellet, a sphere, or a honeycomb.

4. The molded product of activated carbon according to claim 1, wherein the solvent is at least one alcohol, ether, ketone, ester, aprotic solvent, or a mixture of water and at least one of these solvents.

5. The molded product of activated carbon according to claim 1, wherein the drying step is carried out at 70 to 150° C.

6. The molded product of activated carbon according to claim 1, wherein the carbonization step is carried out at 500 to 1500° C.

7. A method of producing an molded product of activated carbon comprising steps of (1) molding a kneaded mixture containing an activated carbon, a solvent, and he a phenol-aldehyde resin being solid at 25° C. and containing 50 to 95% by weight of components soluble in the solvent, (2) drying and curing the molded mixture, and then (3) carbonizing the molded mixture in an inert gas atmosphere.

* * * * *